United States Patent [19]
Narayanaswami

[11] Patent Number: 6,160,557
[45] Date of Patent: Dec. 12, 2000

[54] METHOD AND APPARATUS PROVIDING EFFICIENT RASTERIZATION WITH DATA DEPENDENT ADAPTATIONS

[75] Inventor: Chandrasekhar Narayanaswami, Valhalla, N.Y.

[73] Assignee: International Business Machines Corporation, Armonk, N.Y.

[21] Appl. No.: 08/733,284

[22] Filed: Oct. 17, 1996

[51] Int. Cl.[7] .................................................. G06T 15/00
[52] U.S. Cl. .............................................................. 345/422
[58] Field of Search ..................................... 345/422, 433, 345/434, 435, 419–421, 426

[56] References Cited

U.S. PATENT DOCUMENTS 4,876,644  10/1989  Nuechterlein et al. ................. 364/200

OTHER PUBLICATIONS

Perlin et al. "Pad An Alternative Approach to the Computer Interface" Siggraph, 1993.
"Applying Rambus Technology to Graphics," *Rambus Inc.*, pp. 5–15 and 31–49 (1993).
"Architectural Overview," *Rambus Inc.*, pp. 20–22 (1993).
"Design and Performance Evaluation of a Pixel Cache Implemented Within Application–Specific Integrated Circuits," *The Visual Computer*, vol. 12, pp. 215–233 (1996).
"Efficient Evaluation of 1/x for Texture Mapping," *IBM Research Report RC20357* (Jan. 1996).
"A Fast Shaded–Polygon Renderer," *Computer Graphics*, vol. 20, No. 4, pp. 95–101 (1986).
"Efficient Parallel Gouraud Shading and Linear Interpolation over Triangles," *Computer Graphics Forum*, vol. 15, No. 1, pp. 17–24 (1995).
"The Setup for Triangle Rasterization," *Proceeding of the 11th Eurographics Workshop on Graphics Hardware*, Poitiers (France), pp. 49–58 (Aug. 26–27, 1996).
"Pixel–Planes 5: A Heterogeneous Multiprocessor Graphics System Using Processor–Enhanced Memories," *Computer Graphics*, vol. 23, No. 3, pp. 79–88 (Jul. 1989).
"Measuring the Accuracy of Reciprocal ROM Tables," *IEEE Transactions on Computers*, vol. 43, No. 8, pp. 932–940 (1994).
"Graph–based Algorithms for Boolean Function Manipulation," *IEEE Transactions on Computers*, pp. 677–691 (Aug. 1986).
Computer Graphics Principles and Practice, *Addison–Wesley Publishing Company*, pp. 124–127, (1990).

*Primary Examiner*—Almis R. Jankus
*Attorney, Agent, or Firm*—F. Chau & Associates, LLP

[57] ABSTRACT

The invention reveals faster techniques for scan conversion, slope calculations, and z-buffer and frame-buffer access in the rasterization process of a computer graphics system. This is accomplished by optimizing the method and apparatus to exploit the small size of triangles in applications, and also by taking into account the response of the human visual system to color and depth. Additionally, depth and color information in the z-buffer and image buffer are prefetched into cache memory, thus eliminating the bottleneck associated with accessing these buffers.

45 Claims, 3 Drawing Sheets

LEGEND

• PIXEL LOCATIONS

○ SET S OF PIXELS COVERED BY $T_1$

LEGEND

• PIXEL LOCATIONS

▲○ SET S OF PIXELS COVERED BY $T_1$

○ SUBSET $S_V$ OF S WHICH IS VISIBLE

METHOD AND APPARATUS PROVIDING EFFICIENT RASTERIZATION WITH DATA DEPENDENT ADAPTATIONS

FIELD OF THE INVENTION

The invention relates to a computer graphics system for processing and displaying graphical data representing three-dimensional objects, and, more particularly, to the rasterization of the objects for display.

BACKGROUND OF THE INVENTION

Computer graphics systems are frequently used to model a scene having three-dimensional objects and display the scene on a two-dimensional display device such as a cathode ray tube or liquid crystal display. Typically, the three-dimensional objects of the scene are each represented by a multitude of polygons (or primitives) that approximate the shape of the object. Rendering the scene for display on the two-dimensional display device is a computationally intensive process. It is therefore frequently a slow process, even with today's microprocessors and graphics processing devices.

Rasterization is the process which converts the simple, geometric description of a graphics primitive into pixels for display. In order to display z-buffered, Gouraud shaded texture mapped triangles, rasterizers need to perform scan conversion, color, depth and texture interpolation, and several pixel operations, including visibility determination. To interpolate within the triangle, rasterizers need to compute slopes in the x and y directions for colors, depth and textures.

A typical primitive, as shown in FIG. 1A, is a triangle $T_1$. Other area or surface primitives conventionally are converted into one or more triangles prior to rasterization. Consequently, the conventional rasterization process need only to handle triangles. The triangle $T_1$ is represented by the (x,y,z) coordinates and other properties (such as colors and texture coordinates) at each of its vertices. The (x,y) coordinates of a vertex tell its location in the plane of the display. The z-coordinate tells how far the vertex is from the selected view point of the three-dimensional scene. Rasterization may be divided into three tasks: scan conversion, shading, and visibility determination.

Scan conversion utilizes the (x,y) coordinates of the vertices of each triangle to compute a set of pixels, S, which cover the triangle. Scan conversion is usually done by traveling from the left edge of the triangle to the right edge of the triangle and visiting pixels in between. Another scan conversion approach, used by Pixel Planes, is to use a processor per pixel and compute whether the pixel is inside the triangle by evaluating three edge equations, one for each edge of the triangle. In order to determine if an edge is a left edge or a right edge, the vertices of the triangle have to be sorted by their x and y coordinates. The edge that has the longest projection on the y axis is often used as the starting edge in the scan conversion process. In order to avoid visiting pixels twice along edges that are shared by triangles, a consistent rule for making ownership of such pixels mutually exclusive between adjacent triangles may be used. One such rule is that if an edge is shared by more than one triangle, the pixel is drawn if it is on the left (bottom edge, if the edge cannot be classified as left or right) edge of the triangle.

For Gouraud shading, interpolation for pixels within a triangle is done by implementing the equation below with incrementers. For example the red color component at a location (x,y) is computed as follows.

$$R(x,y)=R(x0,y0)+(x-x0)*dR/dx+(y-y0)*dR/dy$$

In the above, dR/dx is the slope of the red component in the x direction and dR/dy is the slope of the red component in the y direction.

There are numerous other schemes for computing colors, some of which involve more computationally intensive techniques. Common to these techniques is the interpolation of additional parameters for each pixel. In Phong shading, the normal, N, is interpolated for every pixel in the triangle. In texture mapping, S, T, and W coordinates are interpolated within the triangle in much the same way as R, G, and B are interpolated in Gouraud shading.

Visibility determination utilizes the z-coordinate, also called the depth value, of each pixel to compute the set of pixels, $S_v$ (a subset of S), which are "visible" for the triangle. The z-coordinate of each pixel may be determined by interpolation between the z-coordinate specified for each vertex of the triangle. The set $S_v$ will differ from the set S if any of the pixels in set S cover the previously rasterized triangles whose z-values are closer to the selected view point. Thus, for each triangle in the scene, a pixel is "visible" if it is in the set $S_v$ or "hidden" if it is the set S, but not in the set $S_v$. For example, FIG. 1B shows two triangles, T1 and T2, wherein triangle T1 is partially hidden by triangle T2. Computing $S_v$ (a subset of S) includes reading the z-buffer and performing a comparison of depth values.

Typically, the position of each triangle is identified by (x,y,z) coordinates of a set of three vertices, with each vertex having a reflectance normal vector with the vertex at its origin. The reflectance normal vectors of each triangle along with information about the position of the light source:; are used to calculate the effect of the light sources on the color values determined during the shading calculations for each triangle.

Rasterization is completed by writing the colors of the set of visible pixels $S_v$ to an image buffer for display, and writing the z-coordinate of the set of visible pixels $S_v$ to a z-buffer.

Rasterization takes a considerable amount of processor cycles and hardware. As we move to create faster devices, innovative techniques to increase speed and reduce power consumption become very important.

One drawback of prior art scan conversion systems is that they do not adapt to different sizes of triangles. This leads to a performance penalty on small triangles. This shortcoming causes significant performance degradation because in several applications the average triangle has less than 20 pixels. In many cases the average triangle is even smaller.

Another drawback with prior art approaches is that they assume the worst-case triangles (with the maximum possible area) for determining the precision to which dR/dx, dR/dy, etc., need to be computed to avoid any interpolation errors for pixels in the triangle. This turns out to be a design "overkill" because worst-case triangles rarely occur. Thus existing systems use more cycles than necessary and consume more power than required.

Reading the z-buffer to determine visibility is usually a bottleneck in prior art systems because computer memories operate at much lower clock speeds than logic circuits.

Consequently, it would be desirable to have a rasterization system and method which adapts to different graphics primitive sizes, providing faster scan conversion for smaller primitives. It would also be desirable to have a rasterization system and method that adjusts the precision of calculated slopes where possible to enhance performance. Finally, it would be desirable to have a rasterization system and method that rapidly accesses the z-buffer, and the image buffer if necessary, without adversely affecting system performance.

SUMMARY OF THE INVENTION

Accordingly, the present invention reveals faster techniques for scan conversion, slope calculations, and z-buffer and frame-buffer access in the rasterization process of a computer graphics system. This is accomplished by optimizing the method and apparatus to exploit the small size of triangles in applications, and also by taking into account the response of the human visual system to color and depth. Additionally, depth and color information in the z-buffer and image buffer are prefetched into cache memory, thus; eliminating the bottleneck associated with accessing these buffers.

A feature of the present invention is that triangles are classified according to size. Most triangles in applications; are small, often 20 pixels or less. For such small triangles it is feasible to use look up tables for scan conversion. So given x0, y0, x1, y1, x2, and y2 for a triangle, a look up table will return a list of pixels for the triangle. Thus the scan conversion process is sped up considerably.

In addition, the color, texture, and depth slopes (dR/dx, dR/dy, etc.) for small triangles need to be computed to a much lower precision than for larger triangles. This concept also applies to the shape of the triangle. For tall, skinny triangles there are fewer pixels in the x direction, which allows us to compute the slopes in the x direction to a lower precision. Similarly, for short, fat triangles the slope in the x direction will be computed to a higher precision than the slope in the y direction.

Another feature of the present invention is that the actual color values (R, G, and B) and the response of the human visual system are taken into account during slope computations. For example, on a 24-bit display system (8 bits each for red, green, and blue), the human eye is more sensitive to the difference between color values of 19 and 20 than it is to the difference between 234 and 235. Thus a lower precision slope is acceptable when operating with high color values. Similarly, due to the nature of the perspective z transform, small differences in z values close to the eye map to large differences after the transform. Therefore, for smaller z values, it is possible to use slopes with smaller precision.

An additional feature of the present invention is that z-buffer data and image buffer data are prefetched into on-chip caches once the shape of the triangle is known at the start of the scan conversion. This eliminates the bottleneck found in the prior art.

DETAILED DESCRIPTION OF THE PREFERRED EMBODIMENTS

Figure 1A:
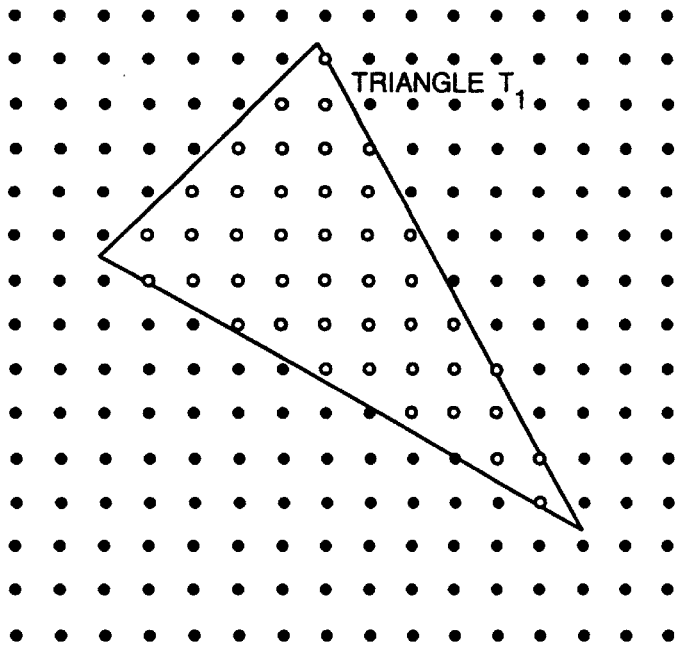
FIG. 1A is a pictorial representation of the rasterization of a triangle T1.
Figure 1B:
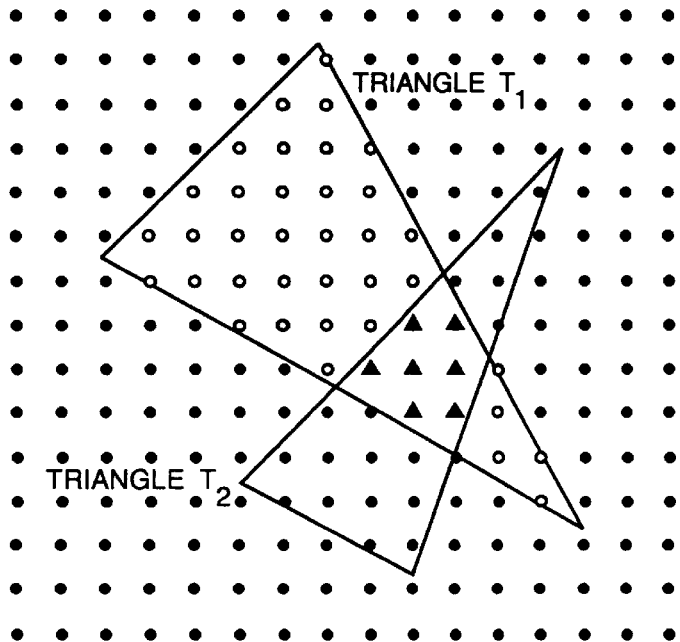
FIG. 1B is a pictorial representation of the rasterization of triangles T1 and T2, wherein triangle T1 is partially hidden by triangle T2.
Figure 2:
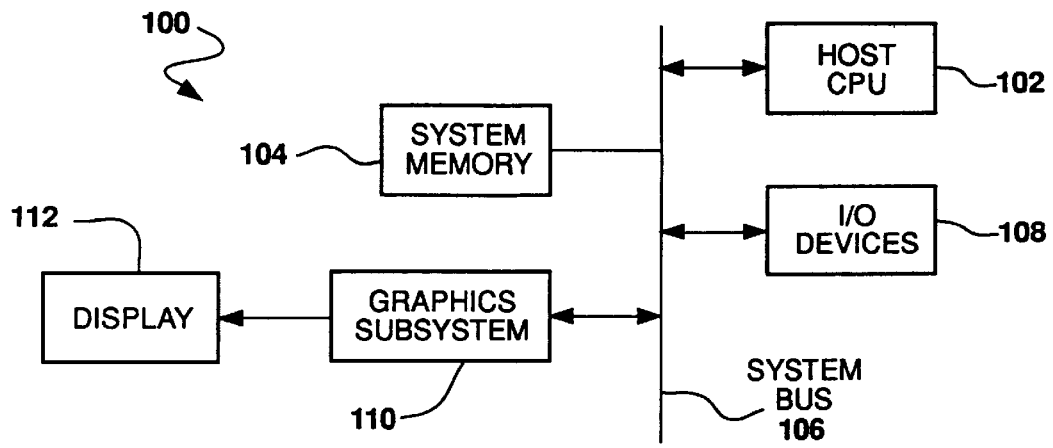
FIG. 2 is functional block diagram of a graphics work station.

FIGS. 1A and 1B were described in the Background of the Invention section above. The overall architecture of the present invention is depicted in FIG. 2. As shown, a graphics system 100 includes a host processor 102 which is coupled to a system memory 104 via a system bus 106. The system memory 104 consists of random access memory (RAM) that: stores graphics data defining the objects contained in one or more three dimensional models. The graphics data that defines each object consists of coordinates and attributes (e.g. color, reflectance, texture) of primitives. The primitives are geometric entities such as a polygon, line or surface. Typically, the primitives are triangles defined by the coordinates and other properties (such as colors, normals, texture) of a set of three vertices. In this case, the system memory 104 includes an ordered list of vertices of the triangles that define the surfaces of objects that make up a three dimensional scene. In addition, the system memory 104 may store a list of triangle identifiers that correspond to each of the triangles and transformation matrices that specify how the triangles are situated and oriented in the scene.

Input/output (I/O) devices 108 interface to the host: processor 102 via the system bus 106. The I/O devices may include a keyboard, template or touch pad for text entry and/or a pointing device such as a mouse, trackball, Spaceball or light pen for user input.

The graphics system 100 also includes a graphics subsystem 110 that interfaces to the system memory 104 via the system bus 106. Generally, the graphics subsystem 110 operates to render the graphics data stored in the system memory 104 for display on a display screen 112. Although the graphics subsystem is illustrated as part of a graphics work station, the scope of the present invention is not limited thereto. Moreover, the graphics subsystem 110 of the present invention as described below may be implemented in hardware, such as a gate array or a chip set that includes at least, one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety. In the alternative, portions of the graphics subsystem 110 may be implemented in software together with a processor. The processor may be a conventional general purpose processor, a part of the host processor 102, or part: of a co-processor integrated with the host processor 102.

Figure 3:
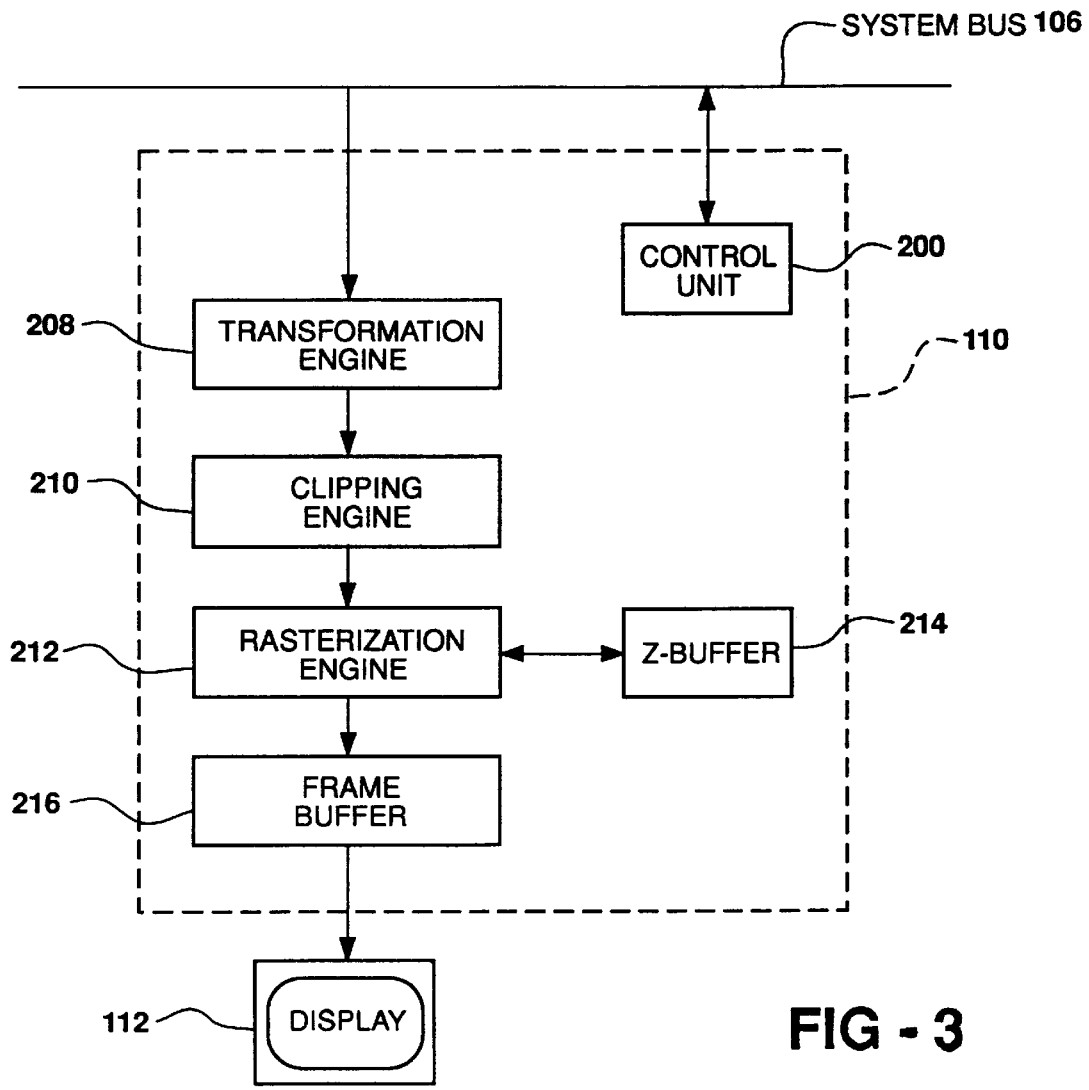
FIG. 3 is a functional block diagram of a graphics subsystem of the graphics work station of FIG. 2.

More specifically, as shown in FIG. 3, the graphics; subsystem 110 includes a control unit 200 that supervises the operation of the graphics subsystem 110. The control unit 200 selects the graphics data associated with one or more. triangles, as stored in the system memory 104, and passes the graphics data on to a rendering pipeline via the system bus 106.

The rendering pipeline includes a transformation engine 208, a clipping engine 210, a rasterization engine 212, a z-buffer 214 and an image buffer, or frame buffer 216. The z-buffer 214 typically contains sufficient memory to store a depth value for each pixel of the display 112. Conventionally, the depth value is stored as a 24-bit integer for each pixel. Frame buffer 216 typically contains sufficient memory to store color data for each pixel of the display 112. Conventionally, the color data consists of three 8-bit integers representing red, green and blue (R, G, B) color values for each pixel. In addition, the rendering pipeline may include a texture memory (not shown) for storing texture maps.

The transformation engine 208 transforms the graphics data from the intrinsic coordinate system of the model into a normalized device coordinate system. In the case where the graphics data consists of coordinates of vertices of the triangles that define the objects of the three-dimensional scene, the transformation engine 208 outputs the coordinates of the vertices in a normalized device coordinate system. A more detailed description of the transformation operation may be found in Foley, Van Dam, Feiner and Hughes, Computer Graphics Principles and Practice, pp. 124–127 (2nd Ed. 1990), herein incorporated by reference in its entirety.

The clipping engine 210 clips the transformed triangles against a predefined clipping volume to define the portions of the transformed triangles that are potentially visible. The result of this step is a list of vertices in the normalized device coordinate system that describe potentially visible portions of the triangles. A more detailed description of the clipping operation may be found in Foley, Van Dam, Feiner and Hughes, Computer Graphics Principles and Practice, pp. 124–127 (2nd Ed. 1990).

The rasterization engine 212 decomposes the potentially visible portion of the triangles output by the clipping engine 210 to calculate and store in the frame buffer 216 the color of visible pixels which cover each triangle. In doing so, the rasterization engine performs the following operations: scan conversion, slope calculations, shading, and visibility determination.

Scan Conversion

According to the present invention the scan conversion operation operates as follows. First, the triangle is classified as either small or large by determining its area. If classified as large the rasterization methods from prior art are used. If the triangle is small the invention taught below is used to perform the scan conversion.

A triangle is defined by three points corresponding to its 3 vertices.

V0=(x0, y0, z0, r0, g0, b0, a0)
V1=(x1, y1, z1, r1, g1, b1, a1)
V2=(x2, y2, z2, r2, g2, b2, a2)

For small triangles, we use look up tables to retrieve the pixels in the triangle. This allows us to skip the edge set up and edge walking stages, and reduces the number of stages in the rasterization pipeline. Clearly, this approach is viable only for small triangles because of the size of such tables. Therefore, we use look up tables for any triangle whose bounding box covers less than 64 pixels, i.e., an 8×8 area. The size of the bounding box for the triangle is determined first. The bounding box is the smallest rectangular box with horizontal and vertical edges that contains the triangle. This can be done by checking that the three x-coordinates for the triangle differ only in the four least significant bits (log 8+1=3+1), and the three y-coordinates for the triangle differ only in the four least significant bits (log 8+1=3+1).

Next, the x and y coordinates of each of the three vertices with respect to the lower left corner of the bounding box is determined. This can be done with a few subtractions on four-bit quantities, and the resulting x and y coordinates will have only three bits. So the triangle will be converted to three pairs of three bit quantities, i.e., an 18 bit input. For each such input, a 64 bit number will be stored. A bit in this number will be a 1 if the pixel corresponding to that location is inside the triangle and 0 otherwise. The first eight bits will correspond to the bottom row of the bounding box. The last eight bits will correspond the top row of the bounding box. So the overall requirement will be 2**18*64 bits=16,777, 216 bits=2 MB of data.

In order to reduce the storage requirements, alternate embodiments may use one of the vertices of the triangle as the origin of the bounding box and represent the three vertices with respect to this origin and exploit spatial symmetries By doing this, either the x or y coordinate of each of the three vertices of the triangle will match either the x or y coordinate of the origin of the bounding box for the triangle. This reduces the 18 bit input per triangle to a 12 bit input: per triangle and thereby reduces the storage to 32 KB of data, which is a significant saving over the 2MB required for the first method.

As another optimization, a start point and a run length for each row in the 8×8 bounding box may be stored, reducing the 64-bit number to a 48-bit number. This reduces the memory required in the first alternative above from 2 MB to 1.5 MB. In the second alternative it reduces from 32 KB to 24 KB. Such a representation is more suitable for the interpolation stage since it allows the rasterizer to jump to the first pixel on a row in the bounding box. In the rest of this document the requirements and speeds for the case where 48 bits are stored will be kept in parentheses.

To implement the above a RAMBUS memory device can be used (see Applying Rambus Technology to Graphics, Rambus, Inc., pp. 5-49). Assuming a bandwidth of 500 MB/s for the above device and the fact that each triangle takes 8 (6) bytes, this device is capable of handling 500/8=62.5 (83) million triangles/sec. Such rates are not possible with logic that does not use massively parallel elements, because even with a 200 Mhz clock, only 3 (2) cycles are available to generate all the pixels in the triangle. Such designs would be very difficult. Even the Infinite Reality machine from Silicon Graphics is capable of only 10 million triangles per second.

It is worth noting that several rasterizers may share this common memory device, so that the 62.5 million triangle/sec rate can be achieved.

In another alternative form, the lookup table may be implemented as a combinatorial circuit with 18 (12) inputs and 64 (48) outputs. There would be 64 (48) functions of 18 (12) input variables. This circuit can be minimized significantly because there is much correlation between successive entries in the look up table. Techniques such as BDD (Binary Decision Diagrams) can be used for circuit minimization. This would. require significantly fewer gates than a dedicated memory device solution.

Slope Calculation:

Slopes are calculated to represent the rate of change of color (and other values, such as texture coordinates, the normal vector, and the z-value) in both the x and y direction. The invention handles the slope calculation stage as described below. The example discussed is for the red, or R, component. Note that the notation i.f denotes a number stored with i integer bits and f fractional bits.

The bounding box for the triangle is computed first. Then the minimum of r0, r1 and r2 determined. This value is denoted min_c.

If the width of the bounding box is less than 63 and min_c is greater than 127 the R slope in x will be computed as an 8.8 quantity.

If the width of the bounding box is less than 63 and min_c is less than 127 the R slope in x will be computed as an 8.16 quantity.

If the width of the bounding box is greater than 63 and min_c is greater than 127 the R slope in x will be computed as an 8.16 quantity.

If the width of the bounding box is greater than 63 and min_c is less than 127 the R slope in x will be computed as an 8.24 quantity.

Similar statements apply for slopes in the y-direction, and for G and B values, and any other values that are interpolated such as the normal N, and texture coordinates such as S, T, and W. A similar decision scheme will be used for the z slopes. However, in this case smaller z values for the vertices of the triangles will imply that a lower precision slope is sufficient. For this purpose the maximum of z0, z1 and z2 will be computed and denoted max-z. If max-z is less than 2**12 a lower precision will be used for the slope. Precision changes based on the width of the bounding box will be similar to the ones used for R.

As with many existing systems, slopes will be computed with an iterative Newton Raphson method. A more detailed description of the Newton Raphson method may be found in Narayanaswami et al., Efficient Evaluation of 1/x for Texture Mapping, IBM Research Report RC 20357, January 1996 and DasSarma et al., Measuring the Accuracy of Reciprocal ROM Tables, IEEE Transactions on Computers, Vol. 43, No. 8, 1994, pp. 932–940, herein incorporated by reference in their entirety. Eight-bit seeds will be stored for key values. Higher precision slopes will be computed using extra iterations of the Newton Raphson method. This will use fewer cycles for lower precision slopes and more cycles for higher precision results.

The data paths for the interpolation circuitry will have 24 fraction bits. When lower precision slopes are used complete byte portions will be turned off. This has two benefits. One, this reduces the power consumption of the rasterizer circuits since fewer circuits are switching. Second, carry look ahead adders will compute their results faster as they wait less for propagated carries.

More specific details of the slope calculation are now presented.

We start with the "overkill" design used in prior art and then refine it to adapt to the size and other characteristics of the current triangle. We will assume a maximum 4K×4K screen is supported. X, Y coordinates could have subpixel positioning with 2 bits. So x, y coordinates in screen space will be represented at 12.2=14-bit quantities. R (red), G (green), B (blue), and A (alpha) will be represented as 8-bit quantities. Z (depth) will be a 24-bit quantity. S, T, and W (texure) will be represented as 10-bit quantities.

The slope of the red component in the x direction is denoted by dR/dx and is computed as $$|dR/dx|=[(r1-r0)*(y1-y2)-(r1-r2)*(y1-y0)]/[(x2-x0)*(y1-y0)-(y2-y0)*(x1-x0)]$$

The slope of the red component in the y direction is denoted by dR/dy and is computed as $$|dR/dy|=[(r1-r2)*(x1-x0)-(r1-r0)*(x1-x2)]/[(x2-x0)*(y1-y0)-(y2-y0)*(x1-x0)]$$

Slopes for the other components such as blue, green, alpha, and depth will be computed in a similar fashion.

The following symbols will be used in the description:

n_w=bits for integer coordinates in window n_s=sub pixel bits n_tx=number of bits in x dimension (subpixel) of bounding box for triangle n_ty=number of bits in y dimension (subpixel) of bounding box for triangle n_r=number of bits in R n_z=number of bits in Z ½**n_e=acceptable error tolerance span_x=max(|x1-x0|, |x1-x2|, |x2-x0|)

span_y=max(|y1-y0|, |y1-y2|, |y2-y0|)

span_r=max(|r1-r0|, |r1-r2|, |r2-r0|)

It is more difficult to use look up tables for slopes than for scan conversion because the look up tables would be prohibitively large. In this case we have to deal with r0, r1, and r2 in addition to x0, x1, x2, y0, y1, and y2. Because r0, r1, and r2 can take on any values from 0 to 255 in a 24_bit display system, the number of entries would increase by a factor of 2**24 over the scan conversion look up table.

Thus we will use a variation of the traditional approach used in prior systems. Slopes have to be computed so that interpolation across the largest possible triangle in the screen does not show substantial error. For example, an exact value of 75.51 will be rounded to 76.0. However, if 75.51 is computed as 75.49 it will be rounded to 75.0. So an error of 0.02 in computation will result in an error of 1.0 after quantization to integer values. Clearly, the number of cases where this happens can be minimized by computing as accurately as possible, but such errors cannot be avoided. On the other hand, computing 75.01 as 75.49 leads to the same final result of 75.0 and computing it exactly as 75.49 yields no advantage. Since a majority of the errors are due to quantization to integer values, one may question the meticulous computation for values that are close to 75.5. For colors, such meticulousness is definitely unnecessary.

We assume that ½**n_e is the maximum error we will allow. This means that (4*4K*dR/dx+4*4K*dR/dy) should have an error of ½**n_e or less. So we use ¹⁄₂₅₆= 0.00390625 as a sufficient accuracy bound.

Thus the error in dR/dx and dR/dy has to be less than 1/(2*2**n_e*4K*4)=1/(223). Therefore an error of 2(−24) in the representation of the slope is acceptable. This means that 24 bits will be needed in the fractional part of the slopes. Thus the number of fraction bits needed is n_w+n_s+n_e+2.

The integer parts of the slopes will need to have as many bits as the maximum value of that parameter.

Therefore R, G, B, and A slopes should be of the form 8.24 or n_r.n_s+n_w+n_e+2. Similarly, z slopes should be 24.24 or n_z.n_s+n w+n_e+2. Texure slopes should be of the form 10.24.

Next, we adapt the above to match the size of the triangle. It is clear that in the above expressions we could replace n_s+n_w+2 with n_tx+1 for slopes in the x-direction and with n_ty+1 for slopes in the y direction. Thus for the x-slope we need n_r.n_tx+n_e+1 bits and for the y slope we need n_r.n_ty+n_e+1 bits. This reduces the number of bits required in the slopes. The following table shows the number of bits actually required and the number of bits computed in present systems for various triangle sizes.

For n_e=2:

| Triangle Bounding Box Size x * y In Subpixels | Required Bits R Slope in x | Required Bits R Slope in y | Bits Computed in Prior Art |
|---|---|---|---|
| 1*1 | 8.4 | 8.4 | 8.18 |
| 3*3 | 8.5 | 8.5 | 8.18 |
| 7*7 | 8.6 | 8.6 | 8.18 |
| 15*15 | 8.7 | 8.7 | 8.18 |
| 31*31 | 8.8 | 8.8 | 8.18 |
| 63*63 | 8.9 | 8.9 | 8.18 |
| 127*127 | 8.10 | 8.10 | 8.18 |

A 63*63 subpixel triangle can have 15*15=225 pixels and is quite big. This catches most of the triangles in many applications. So for n_e=2 or for a margin of 0.25, in many cases we can do with an 8.8 slope and do not need a 8.18 slope.

For n_e=8:

| Triangle Bounding Box Size x * y In Subpixels | Required Bits R Slope in x | Required Bits R Slope in y | Bits Computed in Prior Art |
| --- | --- | --- | --- |
| 1*1 | 8.10 | 8.10 | 8.24 |
| 3*3 | 8.11 | 8.11 | 8.24 |
| 7*7 | 8.12 | 8.12 | 8.24 |
| 15*15 | 8.13 | 8.13 | 8.24 |
| 31*31 | 8.14 | 8.14 | 8.24 |
| 63*63 | 8.15 | 8.15 | 8.24 |
| 127*127 | 8.16 | 8.16 | 8.24 |

A 63*63 subpixel triangle can have 15*15=225 pixels and is quite big. This catches most of the triangles in many applications. So for n_e=8, in a majority of cases we cart do with an 8.15 slope and do not need an 8.24 slope. Shading (Interpolation):

Once the addresses for the pixels in the triangle are known several interpolator circuits can take over and interpolate in parallel (as shown in Narayanaswami, Efficient Gouraud Shading and Linear Interpolation Over Triangles, Computer Graphics forum, Vol 14, no. 1, pp. 17–24, 1995). Each interpolator circuit could either handle a single horizontal span of the triangle or a contiguous block of pixels within the triangle.

Cache Prefetch For Visibility Determination:

In modern rasterizers it is common to use caches for z-buffers and frame buffers (see Ikedo, Design and Performance Evaluation of a Pixel Cache Implemented Within Application-Specific Integrated Circuits, Visual Computer Vol. 12, 1996, pp. 215–233). These caches help reduce the latency of fetching from memory and speed up the rasterization process. However the current systems fetch data into cache rather late in the rasterization process. In the invention presented here, the data will be fetched into the cache as soon as the triangle is presented to the rasterizer and the scan conversion look up table has been fetched.

As soon as the bounding box for the triangle is known, the z values will be prefetched into local z-caches. Using the pixel look up tables used for scan conversion, it is possible to avoid prefetching all pixels in the bounding box that are outside the triangle. Z-cache prefetch will be disabled if it is known that the z-buffer was just cleared. This will be determined by maintaining a single bit per pixel on the rasterizer that indicates that the z for that pixel is identical to the clear value.

A count of successful z tests will also be maintained. A successful z test is one where the z of the current incoming pixel indicates that it is closer to the eye than what the z value in the frame buffer indicates. If more than a certain percentage of a predetermined number of tests succeeds, the count is considered high. A high value of this count instructs the memory controller to prefetch the color values, also, in case blending operations that used the values in the. frame buffer are used. This count will be reset when the z-buffer is cleared and also after every few triangles.

Figure 4:
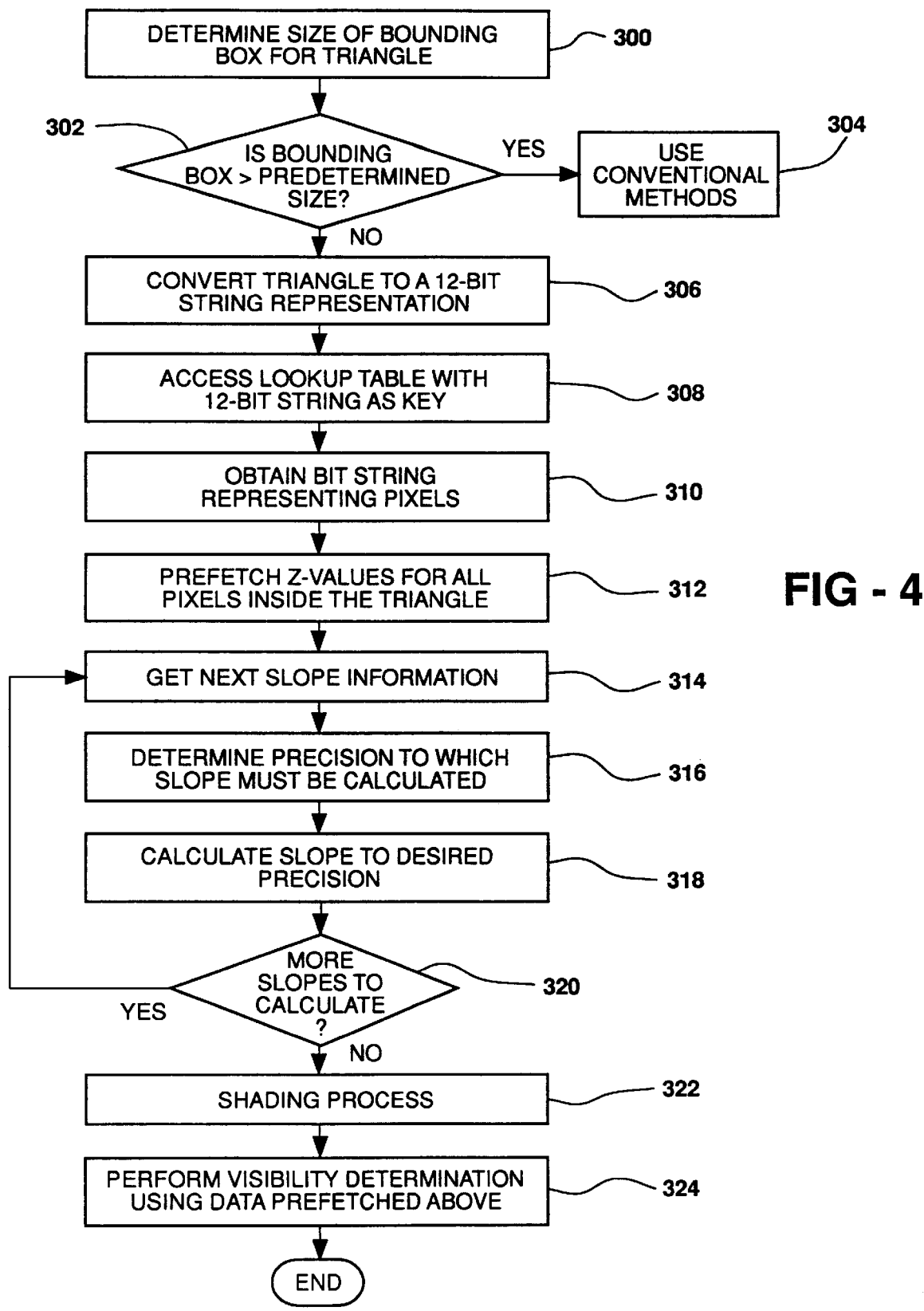
FIG. 4, consisting of FIGS. 4A, 4B, and 4C, is a flow chart depicting the method of the present invention.

FIG. 4 is a flow chart depicting the rasterization process of the present invention as it applies to displaying a single graphics primitive, in this case a triangle, on a display device. As shown in logic steps 300 and 302, the first step is to determine the size of the bounding box of the triangle. If the bounding box is larger than a predetermined size, the triangle is classified as "large," and conventional rasterization methods are used, as shown in logic step 304. However, if the bounding box is smaller than a predetermined size, the triangle is classified as "small," and the method of the present invention is used.

Next, in logic step 306, the triangle is converted into a bit string, in this case a 12-bit string. Note that other size bit strings may be used as discussed above. The bit string is used in logic step 308 to access a lookup table. As shown in logic step 310, the result of the lookup is to obtain a bit string representing the pixels in the triangle's bounding box. In this bit string, a bit will be 1 if the pixel is within the triangle, and 0 if the bit is within the bounding box, but not within the triangle. As soon as this information is obtained, z-values are prefetched for all the pixels in the triangle. This is shown in logic step 312, and the prefetched values are used later in logic step 324.

Logic steps 314 through 320 show the slope calculation process. For each slope that must be calculated (colors, textures, etc.), a determination is made as to how precise the slope calculation must be (step 316). This determination is made using different factors, depending on the slope being calculated, as discussed above. After all slopes have been calculated, shading is done, as shown in logic step 322. Finally, in logic step 324, the prefetched z-values from logic step 312 are used to perform visibility determination.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. A method for displaying graphical data representing three-dimensional objects, comprising the steps of:
   scan conversion, comprising the steps of:
      classifying each graphics primitive to be displayed in one of a plurality of predetermined classes; and
      determining the pixels contained within said graphics primitives;
   calculating, for each of said pixels, one or more slopes in two orthogonal directions wherein said slopes represent the rate of change of one or more attributes of each pixel;
   shading each of said pixels;
   determining for each of said pixels, whether said pixel is visible; and
   displaying said pixels on a display device.

2. A method according to claim 1, wherein the classes are ordered according to the size of the graphics primitives.

3. A method according to claim 1, wherein the step of classifying further comprises the steps of:
   determining a size of a bounding box for each of the one or more graphics primitive, wherein said bounding box is the smallest rectangular box with edges that contains said graphics primitive; and
   classifying in a first class all graphics primitives whose bounding box is smaller than a predetermined area.

4. A method according to claim 3, wherein, for all primitives classified in said first class, determining the pixels contained within a primitive comprises selecting one or more values from a table.

5. A method according to claim 4, wherein said selecting step further comprises:
   representing each first class primitive as a first group of bits; and
   utilizing said first group of bits as a key to select a second group of bits from said table.

6. A method according to claim 4, wherein said table is implemented in a storage.

7. A method according to claim 4, wherein said table is implemented in logic.

8. A method according to claim 1, wherein said calculating step further comprises:
assigning a color value to a pixel; and
calculating lower precision slopes for said pixel if said color value is above a predetermined value.

9. A method according to claim 1, wherein said calculating step further comprises:
assigning a depth value to a pixel; and
calculating lower precision slopes for said pixel if said depth value is smaller than a predetermined value.

10. A method according to claim 1, wherein the step of determining whether a pixel is visible further comprises the: step of prefetching visibility data for each pixel in a graphics primitive immediately after determining which pixels are contained in the primitive.

11. A method according to claim 1, wherein the step of determining whether a pixel is visible further comprises the step of prefetching color data for each pixel in a graphics; primitive immediately after determining which pixels are contained in the primitive.

12. A system for displaying graphical data representing three-dimensional objects comprising:
one or more processors;
a display device, for viewing graphical data representing three-dimensional objects;
a storage system;
one or more input/output devices for a user to input data to the system;
a graphics subsystem comprising:
a control unit for supervising the operation of said graphics subsystem;
means for transforming graphics primitives from the intrinsic coordinate system of a model into a normalized device coordinate system;
means for determining the portions of said transformed graphics primitives which are potentially visible;
a buffer area for storing depth information for each available pixel on said display device;
a buffer area for storing color information for each available pixel on said display device;
means for classifying each graphics primitives to be displayed in one of a plurality of predetermined classes;
means for determining the pixels contained within each of said graphics primitives;
means for calculating, for each of said pixels, one or more slopes in two orthogonal directions wherein said slopes represent the rate of change of one or more attributes of said pixel;
means for shading each of said pixels; and
means for determining for each of said pixels, whether said pixel is visible; and
means for displaying said pixels on said display device.

13. A system according to claim 12, wherein the means for classifying graphics primitives further comprises means for ordering said classes according to size.

14. A system according to claim 12, wherein the means for classifying further comprises:
means for determining a size of a bounding box for each of the one or more graphics primitive, wherein said bounding box is the smallest rectangular box with edges that contains said graphics primitive; and
means for classifying in a first class all graphics primitives whose bounding box is smaller than a predetermined area.

15. A system according to claim 14, wherein, for all primitives classified in said first class, the means for determining the pixels contained within a primitive further comprises means for selecting one or more values from a table.

16. A system according to claim 15, wherein the means for selecting further comprises:
means for representing each first class primitive as a first group of bits; and
means for utilizing said first group of bits as a key to select a second group of bits from said table.

17. A system according to claim 15, wherein said table is implemented in a storage.

18. A system according to claim 15, wherein said table is implemented in logic.

19. A system according to claim 12, wherein means for calculating further comprises:
means for assigning a color value to a pixel; and
means for calculating lower precision slopes for said pixel if said color value is above a predetermined value.

20. A system according to claim 12, wherein means for calculating further comprises:
means for assigning a depth value to a pixel; and
means for calculating lower precision slopes for said pixel if said depth value is smaller than a predetermined value.

21. A system according to claim 12, wherein means for determining whether a pixel is visible further comprises means for prefetching visibility data for each pixel in a graphics primitive immediately after determining which pixels are contained in the primitive.

22. A system according to claim 12, wherein means for determining whether a pixel is visible further comprises means for prefetching color data for each pixel in a graphics primitive immediately after determining which pixels are contained in the primitive.

23. A graphics subsystem comprising:
a control unit for supervising the operation of said graphics subsystem;
means for transforming graphics primitives from the intrinsic coordinate system of a model into a normalized device coordinate system;
means for determining the portions of said transformed graphics primitives which are potentially visible;
a buffer area for storing depth information for each available pixel on a display device;
a buffer area for storing color information for each available pixel on a display device;
means for classifying each graphics primitives to be displayed in one of a plurality of predetermined classes;
means for determining the pixels contained within each of said graphics primitives;
means for calculating, for each of said pixels, one or more slopes in two orthogonal directions wherein said slopes represent the rate of change of one or more attributes of said pixel;
means for shading each of said pixels; and
means for determining for each of said pixels, whether said pixel is visible.

24. A graphics subsystem according to claim 23, wherein the means for classifying graphics primitives further comprises means for ordering said classes according to size.

25. A graphics subsystem according to claim 23, wherein the means for classifying further comprises:
means for determining a size of a bounding box for each of the one or more graphics primitive, wherein said bounding box is the smallest rectangular box with edges that contains said graphics primitive; and means for classifying in a first class all graphics primitives whose bounding box is smaller than a predetermined area.

26. A graphics subsystem according to claim 25, wherein, for all primitives classified in said first class, the means for determining the pixels contained within a primitive further comprises means for selecting one or more values from a table.

27. A graphics subsystem according to claim 26, wherein the means for selecting further comprises:

means for representing each first class primitive as a first group of bits; and means for utilizing said first group of bits as a key to select a second group of bits from said table.

28. A graphics subsystem according to claim 26, wherein said table is implemented in a storage.

29. A graphics subsystem according to claim 26, wherein said table is implemented in logic.

30. A graphics subsystem according to claim 23, wherein means for calculating further comprises:

means for assigning a color value to a pixel; and means for calculating lower precision slopes for said pixel if said color value is above a predetermined value.

31. A graphics subsystem according to claim 23, wherein means for calculating further comprises:

means for assigning a depth value to a pixel; and means for calculating lower precision slopes for said pixel if said depth value is smaller than a predetermined value.

32. A graphics subsystem according to claim 23, wherein means for determining whether a pixel is visible further comprises means for prefetching visibility data for each pixel in a graphics primitive immediately after determining which pixels are contained in the primitive.

33. A graphics subsystem according to claim 23, wherein means for determining whether a pixel is visible further comprises means for prefetching color data for each pixel in a graphics primitive immediately after determining which pixels are contained in the primitive.

34. A method for displaying a graphics primitive comprising the steps of:

determining a size of a graphics primitive; and if the size of the graphics primitive is less than a predetermined size, accessing a lookup table to obtain one or more pixels that comprise the graphics primitive, further comprising the step of:

calculating, for each pixel in the graphics primitive, one or more slopes in two orthogonal directions, wherein the slopes represent a rate of change of one or more attributes of each pixel.

35. A method according to claim 34, wherein said calculating step further comprises:

assigning a color value to a pixel; and calculating lower precision slopes for the pixel if the color value is above a predetermined value.

36. A method according to claim 34, wherein said calculating step further comprises:

assigning a depth value to a pixel; and calculating lower precision slopes for the pixel if the depth value is smaller than a predetermined value.

37. A graphics subsystem, comprising:

means for determining a size of a graphics primitive; and if the size of the graphics primitive is less than a predetermined size, means for accessing a lookup table to obtain one or more pixels that comprise the graphics primitive further comprising the step of:

means for calculating, for each pixel in the graphics primitive, one or more slopes in two orthogonal directions, wherein the slopes represent a rate of change of one or more attributes of each pixel.

38. A graphics subsystem according to claim 37, wherein said means for calculating further comprises:

means for assigning a color value to a pixel; and means for calculating lower precision slopes for the pixel if the color value is above a predetermined value.

39. A graphics subsystem according to claim 37, wherein said means for calculating further comprises:

means for assigning a depth value to a pixel; and means for calculating lower precision slopes for the pixel if the depth value is smaller than a predetermined value.

40. A system for displaying graphical data representing three-dimensional objects comprising:

one or more processors;

a display deive;

a storage system;

one or more input/output devices; and a graphics subsystem comprising:

means for determining a size of a graphics primitive; and if the size of the graphics primitive is less than a predetermined size, means for accessing a lookup table to obtain on or more pixels that comprise the graphics primitive, further comprising the step of:

means for calculating, for each pixel in the graphics primitive, one or more slopes in tow orthogonal directions, wherein the slopes represent a rate of change of one or more attributes of each pixel.

41. A system according to claim 40, wherein said means for calculating further comprises:

means for assigning a color value to a pixel; and means for calculating lower precision slopes for the pixel if the color value is above a predetermined value.

42. A system according to claim 40, wherein said means for calculating further comprises:

means for assigning a depth value to a pixel; and means for calculating lower precision slopes for the pixel if the depth value is smaller than a predetermined value.

43. A method for displaying a graphics primitive comprising the steps of:

determining a size of a graphics primitive;

if the size of the graphics primitive is less than a predetermined size, accessing a lookup table to obtain one or more pixels that comprise the graphics primitive; and determining, for each pixel in the graphics primitive, whether the pixel is visible, said determining step comprising the step of prefetching visibility data for each pixel in the graphics primitive immediately after determining which pixels are contained in the graphics primitive.

44. A graphics subsystem comprising:

means for determining a size of a graphics primitive if the size of the graphics primitive is less than a predetermined size, means for accessing a lookup table to obtain one or more pixels that comprise the graphics primitive; and means for determining, for each pixel in the graphics primitive, whether the pixel is visible, said means for determining comprising means for prefetching visibility data for each pixel in the graphics primitive immediately after determining which pixels are contained in th graphics primitive.

45. A system for displaying graphical data representing three-dimensional objects comprising:

one or more processors;

a display device;

a storage system;

one or more input/output devices; and a graphics subsystem comprising:

means for determining a size of a graphics primitive;

if the size of the graphics primitive is less than a predetermined size means for accessing a lookup table to obtain one or more pixels that comprise the graphics primitive; and means for determining, for each pixel in the graphics primitive, whether the pixel is visible, said means for determining comprising means for prefetching visibility data for each pixel in the graphics primitive immediately after determining which pixels are contained in the graphics primitive.

* * * * *